July 9, 1940.   D. HEYER   2,207,219

VARIABLE SPEED TRANSMISSION DEVICE

Filed Aug. 12, 1935   6 Sheets-Sheet 1

Don Heyer INVENTOR

BY John Flam
ATTORNEY

July 9, 1940.  D. HEYER  2,207,219

VARIABLE SPEED TRANSMISSION DEVICE

Filed Aug. 12, 1935   6 Sheets-Sheet 3

DON HEYER. INVENTOR

BY John Flam ATTORNEY

July 9, 1940.  D. HEYER  2,207,219
VARIABLE SPEED TRANSMISSION DEVICE
Filed Aug. 12, 1935  6 Sheets-Sheet 5

INVENTOR.
Don Heyer
BY John Flam
ATTORNEY.

July 9, 1940.  D. HEYER  2,207,219
VARIABLE SPEED TRANSMISSION DEVICE
Filed Aug. 12, 1935  6 Sheets-Sheet 6

INVENTOR.
Don Heyer
BY John Flam
ATTORNEY.

Patented July 9, 1940

2,207,219

UNITED STATES PATENT OFFICE 2,207,219

VARIABLE SPEED TRANSMISSION DEVICE

Don Heyer, Los Angeles, Calif., assignor to U. S. Electrical Motors Inc., Los Angeles, Calif., a corporation of California Application August 12, 1935, Serial No. 35,810

9 Claims. (Cl. 74—230.17)

This invention relates to an adjustable speed power unit, and more particularly to an integral construction incorporating an electric motor in driving relation to a driving pulley structure, a driven pulley structure in driving relation to a load driving shaft, and a belt for transmitting power from the driving pulley structure to the driven pulley structure, at least one of the pulley structures having an adjustable effective pulley diameter, whereby the variation in speed ratio is obtained.

Such an adjustable pulley structure may include a pair of pulley sections having opposed inclined faces forming a seat for a wedge-shaped driving belt. In order to provide means for adjusting the effective diameter of the pulley structure, the pulley sections are made relatively axially adjustable. In this way the inclined faces can be brought closer together, causing the belt to be urged radially outward to produce an increased effective diameter; or they can be separated, causing the belt to contact with the inclined faces at a shorter radial distance to produce a decreased effective diameter.

The variable speed transmission may have two adjustable pulley structures, or it may include one adjustable pulley structure and one pulley having a fixed effective diameter. When only one adjustable diameter pulley structure is employed, the belt may be maintained in active driving relation to the pulleys by adjusting the center distance between the axes of the two pulleys in accordance with the adjustment of the adjustable pulley structure. When two adjustable pulley structures are employed the pulley structures are arranged to be oppositely adjustable, that is, an increase in effective diameter of one of the pulley structures is accompanied by a compensating decrease in the effective diameter of the other of the pulley structures.

Such variable speed transmissions have been described in several of my earlier applications, which can be identified as follows:

Don Heyer, Variable speed transmission device, Serial No. 631,533, filed September 2, 1932;

Don Heyer, Variable speed power unit, Serial No. 640,707, filed November 1, 1932;

Don Heyer, Variable speed drive with multiple belts, Serial No. 667,379, filed April 22, 1933;

Don Heyer et al., Variable speed power unit, Serial No. 679,034, filed July 5, 1933;

Don Heyer, Ventilated variable speed power unit, Serial No. 711,917, filed February 19, 1934;

Don Heyer, Variable speed power unit, Serial No. 747,410, filed October 8, 1934.

Some of the structure disclosed but not claimed in the present application is made the subject matter of these applications.

In many variable speed power applications it is desirable to enclose the variable speed transmission within a protecting casing to protect the belt and pulley mechanism from dirt, moisture, and other harmful materials; or to prevent the inadvertent entrance of foreign objects into the mechanism of the transmission. The practicability of variable speed transmissions of the type enclosed is dependent upon the life of the driving belt, and the ease with which the adjustment of the belt and pulley structures may be effected, and the accessibility of these parts for replacement or repairs. It is accordingly one of the objects of this invention to provide an enclosed variable speed power unit in which means are provided for so supporting and enclosing the pulley structures and the driving belt, that the belt and pulley structures are readily accessible for replacement, adjustment or repairs.

In one of the embodiments of the invention to be described hereinafter, the adjustable speed transmission is provided with a pair of adjustable diameter pulley structures. One of the pulley structures is directly mounted on the driving shaft of the driving electric motor, and the other pulley structure is directly mounted on the driven shaft, which is provided with a load driving extension projecting to the outside of the enclosing casing. The frame of the driving electric motor is also supported by the casing enclosing the pulley structure.

It is another object of this invention to provide an enclosed variable speed power unit, in which the driving electric motor together with the driving pulley structure may be assembled as a unit and entered into the assembly of the variable speed power unit as a single element, and in which the driven pulley structure together with the load driving shaft may be assembled as a unit and entered into the assembly of the variable speed power unit as a single element.

In another embodiment of the invention which is described hereinafter, the shaft of the driving electric motor is directly coupled to the driving shaft of the adjustable speed transmission, and the frame of the driving electric motor is directly supported on the wall of the casing enclosing the adjustable speed transmission.

It is still another object of this invention to provide an enclosed variable speed power unit in which the driving pulley structure is directly coupled to the driving motor; but in which it is not necessary to remove the driving motor from its supporting structure during adjustment, replacement or repair of the parts of the variable speed transmission.

This invention possesses many other advantages, and has other objects which may be made more easily apparent from a consideration of several embodiments of the invention. For this purpose there are shown a few forms in the drawings accompanying and forming a part of the present specification. These forms shall now be described in detail, illustrating the general principles of the invention; but it is to be understood that this detailed description is not to be taken in a limiting sense, since the scope of the invention is best defined by the appended claims.

Referring to the drawings.

Referring more particularly to the form of the invention disclosed in Figures 1 to 6, inclusive, the adjustable speed power unit 1 is provided with the driving electric motor 2, having the frame 3 and a rotor which is in driving relation to the motor shaft 4. The motor shaft 4 has mounted thereon the adjustable pulley structure 5, which by means of the belt 6 drives the adjustable pulley structure 7, mounted on the driven shaft 8. The driven shaft 8 is provided with the load driving extension 9, which projects to the exterior of the casing 10, enclosing the belt and pulley structures.

The driving motor 2 is supported on the casing 10 by means of the motor adapter bracket 11, which casing also supports the means for adjusting the effective diameter of the driving pulley structure. The casing 10 is in turn provided with appropriate feet 72, whereby it may be secured to a supporting foundation.

The driving pulley structure 5 includes the pulley sections 12 and 13, which are suitably splined to the motor shaft, as by means of the key 14. The pulley section 12 may be secured to the motor shaft by the set screw 15, which passes through the pulley hub and which engages the shaft surface. The effective diameter of the pulley structure is adjusted by moving the pulley section 13 toward, or away from, the pulley section 12. The axial position of the pulley section 13 is adjusted by means of the axially adjustable bearing housing 16, Figure 6, which engages the bearing 17, secured to the hub of the pulley section. The axially adjustable bearing housing 16 is guided and supported by the internal cylindrical surface 19, formed on the neck 18 of the motor supporting member 11. The axial position of the bearing housing is adjusted by the forked lever 21, which is pivotally supported on the extending ear 22 of the motor adapter bracket, and which engages the oppositely positioned pins 23, secured to the bearing housing. The member 18 is provided with the slots 24, which allow the pins 23 to move axially but which prevent the rotation of the bearing housing.

The bearing 17 also provides means for rotatably supporting one end of the motor shaft 4. The other end of the motor shaft is supported by means of a bearing suitably secured within the end bell 20 of the motor.

The driven pulley structure includes the pulley sections 25 and 26, which are in driving relation to the driven shaft. The pulley section 25 is provided with the long bushing 27, which is suitably splined to the driven shaft by means of the key 28. The pulley section 26 may in turn be suitably splined to the bushing 27. The bushing 27 has the bearing 29 secured thereto, which provides means for axially adjusting the pulley section 25. The bearing 29 is held within the axially adjustable bearing housing 30, which, in turn, is supported by the control housing 31. The axial position of the bearing housing 30 is adjusted by means of the rotatably supported lead screw 32, which threadedly engages the bearing cap 33 of the bearing housing. The lead screw has an end projecting outside of the casing to which the manipulating hand wheel 34 is secured. It is obvious from the construction that a rotation of the hand wheel 34 and of the lead screw secured thereto results in a corresponding axial adjustment of the bearing housing 30 and of the associated pulley section 25.

If it is desired, the pulley section 26 may be axially fixed to the driven shaft. However, in the present instance the pulley section 26 provides means for compensating for belt wear and for determining the initial belt tension. For this purpose the hub of the pulley section is provided with the pin 35, which passes through appropriate slots formed in the driven shaft and in the bushing 27. The pulley section 26 is urged into contact with the driving belt by means of the compression spring 36, which is interposed between the screw plug 37 and the pin 35. The force exerted by the spring 36 can be adjusted by the rotation on the screw plug, and the spring may be suitably designed to provide an axial force sufficiently great to maintain the pulley sections 25 and 26 in active driving relation to the belt, under the greatest load normally encountered. If pulley section 26 is to be axially fixed to the driven shaft 8, spring 36 and plug 37 are omitted and the shaft made solid. Pin 35 is used, a hole being provided in the shaft to accommodate it. In this case the pin serves to restrain the pulley sections against axial as well as rotary movement relative to the shaft.

Suitable means are provided for interlocking the adjustment of the driving and driven pulley structures. In the present instance the forked lever 38 is provided, which is pivotally supported on the extending ear 39 of the control housing 31, and which engages the oppositely positioned pins 40, secured to the bearing housing 30. The control housing 31 is provided with the slots 41, which permit the axial movement of the pins 40, but which prevent the rotation of the bearing housing. By means of the construction provided an axial movement of bearing housing 30 results in a pivotal movement of the forked lever 38. The movement of forked levers 21 and 38 is interlocked by the common pivot pin 42, which is detachably secured in the lever 38, as by a cotter pin 189, and which engages the slotted end 43 of the lever 21. The forked levers 21 and 38 may be so proportioned that an increase in the effective diameter of one of the pulley structures results in a compensating decrease in the effective diameter of the other pulley structure.

It is obvious from the construction that the effective diameters of the driving and driven pulley structures are simultaneously adjusted to vary the speed ratio of the variable speed power unit, when the lead screw 32 is rotated by the manipulation of the hand wheel 34.

The adjustment of the speed ratio may be indicated by the speed indicator 44, which is removably secured to the control housing 31, and which is actuated in accordance with the axial position of the bearing housing 30. The manner in which the speed indicator is actuated by the axial adjustment of the bearing housing 30 has been described in detail in several of my copending applications identified above.

One end of the driven shaft 8 is supported by the bearing 29, which is held within the bearing housing 30. The other end of the driven shaft is supported by the bearing 45, which is held within the bearing housing 46, formed by the flanged plate 47 and the bearing cap 48. The flanged member 47 and the bearing cap 48 may be suitably held together by the bolts 49, which pass through the flanged member and which are threaded into the bearing cap, and the bearing housing formed by the two members may be secured to the casing 10 by the bolts 50, which pass through the flanged member and which are threaded into the wall of the casing.

Figure 3:
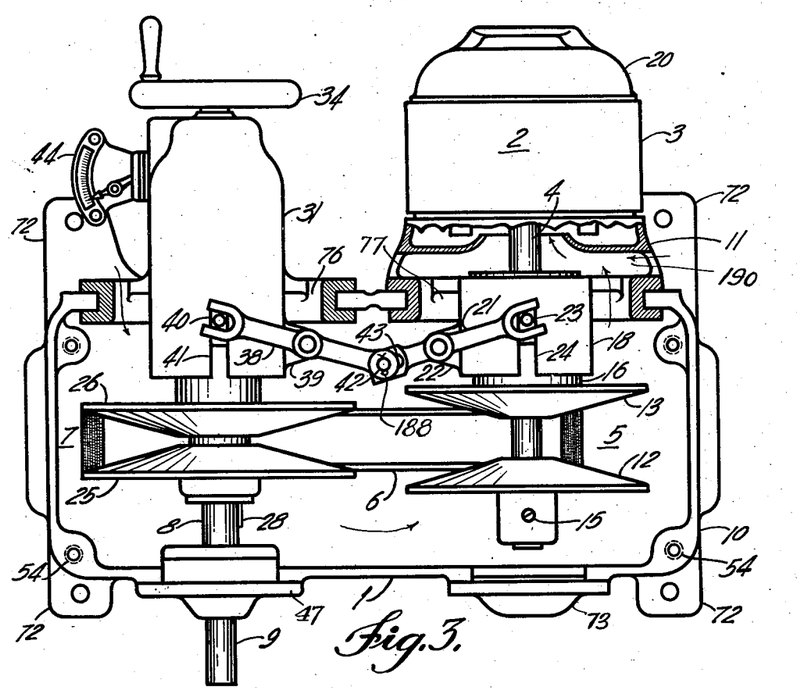
Figure 3 is a plan view, partly in section, of the variable speel power unit of Figure 1, with the cover of the enclosing casing removed.
Figure 4:
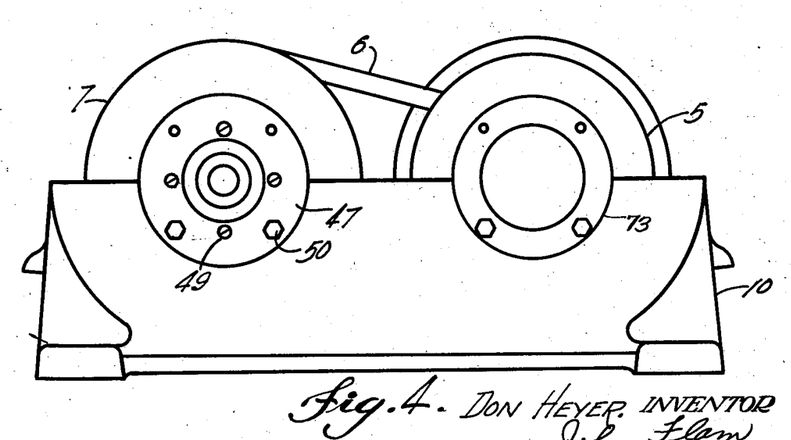
Figure 4 is a side elevation, taken from the front of Figure 3.
Figure 5:
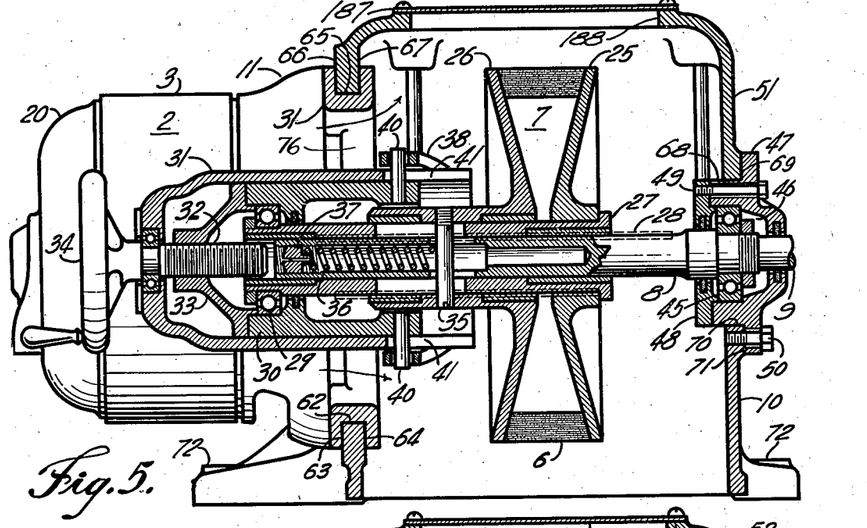
Figure 5 is a vertical sectional view taken along the axis of the driven pulley structure of the variable speed power unit.
Figure 6:
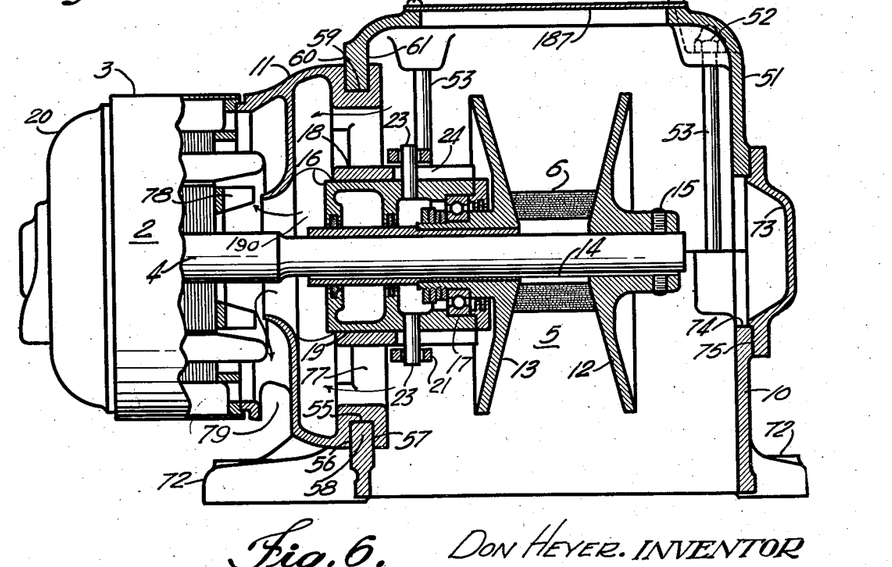
Figure 6 is a vertical sectional view taken along the axis of the driving electric motor and of driving pulley structure of the variable speed power unit.

To provide means whereby the belt and pulley structures may be readily removed from the enclosing casing, the casing 10 is provided with the removable cover 51, which is removably secured to the casing by the studs 53, which engage the tapped holes 54 formed in the main body of the casing, and the nuts 52, which are threaded to the studs. As is illustrated by Figures 3 and 4, the cover member 51 joins the main body of the casing along the plane of the axes of the driving and driven shafts. Thus as illustrated by these figures, when the cover member 51 is removed, substantial access may be had to the belt and pulley structures. To provide access to the pulley structures for inspection or lubrication of the pulley parts, the cover member 51 is provided with the aperture 188 and the removable cover plate 187.

As has been previously set forth, the motor adapter bracket 11 provides means for supporting the driving electric motor and the driving pulley structure on the transmission casing. For this purpose the member 11 has the external cylindrical surface 55 formed thereon, which together with the radial surfaces 56 and 57 form the annular groove 58 extending around the periphery of the member 11. The member 11 is supported on the transmission casing by the engagement of the internal cylindrical surface 59 and the radial surfaces 60 and 61, which are formed partly on the cover member 51 and partly on the main body of the casing, respectively with the cylindrical surface 55 and the radial surfaces 56 and 57, formed on the member 11. It is obvious from the construction that when the cover member 51 is in place the member 11 and the motor and driving pulley structure supported thereby are rigidly supported in fixed position by the engagement of these surfaces.

One end of the driven shaft is supported on the transmission casing by the control housing 31. For this purpose the control housing 31 has the internal cylindrical surface 62 and the radial surfaces 63 and 64 formed thereon, which in every way may be equivalent to the corresponding surfaces formed on the member 11. The control housing 31 is supported on the transmission casing by the engagement of the cylindrical surface 62 and the radial surfaces 63 and 64, with the corresponding cylindrical surface 65 and radial surfaces 66 and 67, formed partly on the cover member 51 and partly on the main body of the casing.

As has been previously set forth, the other end of the driven shaft is supported on the transmission casing by the bearing housing 46, formed by the flanged member 47 and the bearing cap 48. The bearing housing is accurately located on the transmission housing by the engagement of the external cylindrical surface 68 and the radial surface 69, formed on the member 47, with corresponding cylindrical and radial surfaces 70 and 71, formed partly on the cover member 51 and partly on the main body of the casing.

As illustrated by Figures 3, 4, 5 and 6, the cover member 51 joins the main body of the casing 10 along the plane of the axes of the driving and driven shafts. Thus when the cover 51 has been removed, the driving and driven pulley structures together with their supporting shafts may be removed from the casing, upon the removal of the common pivot pin 42, interlocking the adjustment of the two pulley structures. For it is obvious that when the pivot pin 42 is removed, the hand wheel 34 may be operated to permit the driving belt to become slack so that it can be removed from one of the pulley structures. The driving motor 2, together with the driving pulley structure 5, may then be removed from the casing by lifting the motor in a vertical direction until the radial surfaces 56 and 57, formed on the member 11, clear the corresponding radial surfaces 60 and 61, formed on the main body of the casing. The driven pulley structure, together with the control housing and the driven shaft, may also be removed from the casing, upon the removal of the bolts 50, by lifting the control housing and the shaft in a vertical direction until the radial surfaces 63 and 64 clear the corresponding surfaces formed on the main body of the casing.

It is thus obvious that the entire construction associated with the driving and driven pulley structures may be each assembled as a unit and enter into the assembly of the variable speed power unit as single elements, after which the pivot pin 42 may be put in place to interlock the adjustment of the driving and driven pulley structures.

It is to be noted that the surfaces formed on the main body of the casing 10 for supporting the driving motor and the control housing extend half way around the periphery of the annular grooves formed on the members 11 and 31. Thus these members will be rigidly supported on the casing, even when the cover member 51 is removed. It is thus possible to perform all of the adjustments of the driving and driven pulley structures necessary to obtain the correct belt tension and belt alignment, with the cover member 51 removed; or it is possible to remove the cover member 51 to provide access to the belt and pulley structures, without the necessity of disturbing the positions of the driving or driven shafts.

To provide means whereby the driving belt may be removed from the driving pulley structure without removing the driving motor from its support, the removable cover plate 73 is provided adjacent to the end of the motor shaft. This cover plate is removably secured to the casing and is located with respect to the casing by the engagement of the cylindrical surface 74 and the radial surface 75, formed on the casing, with corresponding surfaces formed on the cover plate 73.

When the cover plate 73 is removed, the aperture provided by the internal cylindrical surface 74 provides means whereby the driving belt 6 may be passed over the end of the motor shaft 4, without the necessity of removing the motor from its supporting structure. Thus when it is desired to replace the driving belt, it is only necessary to lift the structure of the driven shaft and it is not necessary to disturb the position of the driving motor, which is generally much more difficult to lift than the structure of the driven shaft.

Figure 1:
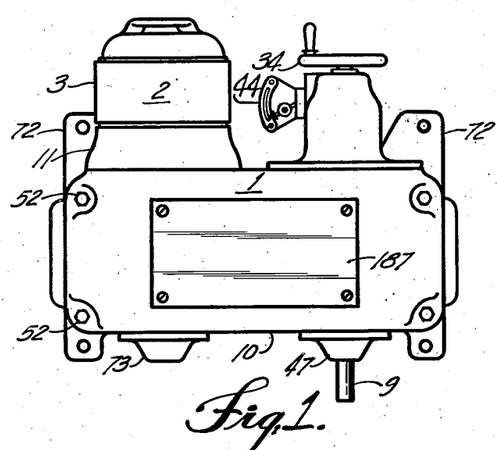
Figure 1 is a plan view of an adjustable speed power unit, embodying the invention.
Figure 2:
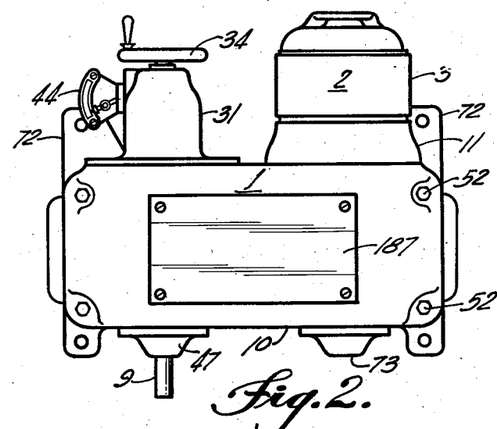
Figure 2 is a plan view, similar to Figure 1, illustrating the manner in which the positions of the driving electric motor and of the load driving shaft may be interchanged.

As has been previously set forth, the cylindrical and radial surfaces 55, 56 and 57, formed on the member 11, are in every way equivalent to the corresponding cylindrical and radial surfaces 62, 63 and 64 formed on the member 31. The positions of these members may thus be interchanged within the case. Thus to provide means whereby the positions of the driving motor and of the load driving shaft may be interchanged with respect to the casing, the surfaces 74 and 75, provided for locating the cover plate 73, are made equivalent to the corresponding surfaces 70 and 71, provided for locating the position of the bearing housing 46, which supports one end of the driven shaft. Thus as illustrated by Figures 1 and 2, the driving electric motor 2 and the cover plate 73 may be interchanged in position with the control housing 31 and the flanged plate 47, to adjust the position of the load driving extension 9 of the driven shaft with respect to the casing.

In order to provide means for ventilating the transmission casing and the driving electric motor, the member 31 is provided with the ventilating openings 76 for passing air into the transmission casing and the motor adapter bracket 11 is provided with the ventilating passages 77 for exhausting the air from the transmission casing into the motor structure. To provide means for producing a circulation of cooling air, the motor shaft has the fan 78 secured thereto, which draws air into the motor structure through the ventilating passages 76 and 77 and which discharges the air from the motor structure through the air discharge passage 79 formed in the member 11. To permit additional cooling air to reach the interior of the motor, inlets 190 are provided in member 11 (see Fig. 3). Air is drawn in through these by fan 78 and mingles with the air being drawn out of the casing through openings 77, the mingled air circulating about the interior of the motor and then being discharged through opening 79.

Another form of the invention is illustrated by Figures 7 to 12. In this form the variable speed transmission includes the driving pulley structure 80, mounted on the driving shaft 81, and which by means of the belt 82 drives the driven pulley structure 83, mounted on the driven shaft 84. Each of the pulley structures includes one pulley section which is axially fixed to its shaft and one pulley section which is axially adjustable with respect to the fixed pulley section. Thus the driving pulley structure 80 includes the pulley section 85, which is axially fixed to the driving shaft 81 by the set screw 86, and the pulley section 87, which is splined to the driving shaft by the key 88. Similarly, the driven pulley structure includes the pulley section 89, which is secured to the driven shaft by the set screw 90, and the pulley section 91, which is splined to the driven shaft by the key 92.

The axially fixed pulley sections 85 and 89 are oppositely faced and axially displaced to maintain the belt in substantial alignment. Each of the axially adjustable pulley sections 87 and 91 has a bearing secured to the hub thereof, which provides means for adjusting the pulley section in an axial direction. Thus the pulley section 91 is provided with the bearing 93, which is axially fixed to the hub of the pulley section by the snap ring 94. The bearing 93 is held within the axially adjustable bearing housing 95, formed by the flanged members 96 and 97, which are suitably held together by the screws 98. The pulley section 87 is likewise provided with the axially adjustable bearing housing 99, which is in every way similar to the bearing housing 95 and which provides means for adjusting the axial position of the pulley section.

Bearing housings 95 and 99 are shifted in an axial direction by the shifting forks 100 and 101, which are held within annular grooves formed on the bearing housings. Thus the bearing housing 95 is provided with the annular groove 98, formed by the flanged members 96 and 97, and the bearing housing 99 is provided with a similar annular groove 102. To prevent the rotation of the bearing housings, each of the bearing housings is provided with a flatted part, which engages the arms of the shift fork. Thus the bearing housing 99 is provided with the flatted portion 189, which engages the arms of the shift fork 101.

The speed ratio of the variable speed drive is adjusted by the rotation of the lead screw 103, which is rotatably supported in fixed axial position. Each of the shift forks has a bushing secured thereto, which threadedly engages the lead screw 103, whereby a rotation of the lead screw results in a corresponding axial adjustment of the shift forks and of the pulley section associated therewith. Thus the shift forks 100 and 101 are respectively provided with the threaded bushings 104 and 105. To provide means for clamping the threaded bushing to the shift forks, each of the shift forks is provided with a sleeve which is split on one side, and within which the threaded bushing is clamped. Thus the shift fork 101 is provided with the split sleeve 106, which is clamped to the threaded bushing 105 by means of the screw 107. Similarly, the shift fork 100 is provided with the split sleeve 108 for holding the threaded bushing 104.

To provide means for adjusting the speed ratio lead screw 103 has the hand wheel 164 removably secured thereto. It is obvious from the construction that a rotation of the hand wheel 164 will result in a corresponding axial adjustment of the shift forks 100 and 101, and of the pulley sections associated therewith.

The relative rates at which the effective diameters of the driving and driven pulley structures must be adjusted if the belt is to be maintained at a substantially constant tension, is dependent upon the relative values of the effective pulley diameters. If the two pulleys are of equal effective diameter, then the effective diameter of one of the pulley structures should be increased at the same rate that the effective diameter of the other pulley structure is decreased. However, when one of the pulley structures has a greater effective diameter than the other pulley structure, then the diameter of the pulley structure, having the greater effective diameter, must be adjusted at a slower rate than the diameter of the pulley structure having the smaller effective diameter, if it is desired to maintain the belt at a constant tension. The relation of the rate of pulley adjustment to the relative pulley diameters has been carefully set forth in my co-pending application, Ventilated variable speed power unit, Serial No. 711,917, filed February 19, 1934.

Thus in the present instance, to maintain the belt at a substantially constant tension, the lead screw 103 is provided with a pair of threads of different pitch. In the form illustrated, the driven pulley structure 83 has a greater average diameter than the driving pulley structure. Thus the thread 109, which engages the threaded bushing 104, is made with a finer pitch than the thread 110 which engages the threaded bushing 105. In this way the effective diameter of the driven pulley structure 83 is adjusted at a slower rate than the effective diameter of the driving pulley structure, to maintain the belt at a substantially constant tension.

In order to limit the axial adjustment of the shift forks to correspond with the maximum effective diameters of the pulley structures, the lock nuts 117 and 118 are provided, which respectively engage the threaded portions 109 and 110 of the lead screw. It is obvious from the construction that, when the effective diameter of the driving pulley structure has been adjusted to its maximum effective diameter, the end of the threaded bushing 104 will come into contact with the lock nut 117, thereby preventing any further increasing adjustment of the diameter of the driving pulley. Conversely, when the effective diameter of the driven pulley structure has been adjusted to its maximum value, the end of the threaded bushing 105 comes into contact with the lock nut 118, thereby preventing a further adjustment in this direction. However, when it is desired to remove the driving belt from the pulley structures, the lock nuts 117 and 118 may be withdrawn to permit the pulley structures to be adjusted until the driving belt is forced entirely off from one of the pulley structures.

The threaded bushings 104 and 105 also provide means whereby the tension of the driving belt may be adjusted. When it is desired to adjust the belt tension, one of the bushings may be released so that it is free to rotate with respect to the split sleeve of the shift fork. The bushing may then be rotated with respect to the lead screw to adjust the belt tension. Thus if it is desired to increase the belt tension, the screw 107 may be released to permit the threaded bushing 105 to rotate within the sleeve 106. The threaded bushing may then be rotated to move the shift fork 101 toward the shift fork 100 to increase the belt tension, after which, the threaded bushing may again be secured within the sleeve by taking up on the screw 107. To provide means whereby the threaded bushings may be easily rotated, each of the threaded bushings is provided with a wrench engaging portion, such as the hexagonal part 184, formed on the bushing 105.

In many variable speed power applications, many conditions arise when it is desired to provide both a constant speed drive and a variable speed drive. For this purpose the driving shaft 81 may be provided with the load driving extension 183, and the driven shaft 84 is provided with the load driving extension 182. By means of this construction one member of the driven machine may be driven at a constant speed by the load driving extension 183 of the shaft 81, and another part of the driven machine may be driven at a variable speed by the load driving extension 182 of the driven shaft 84.

Figure 7:
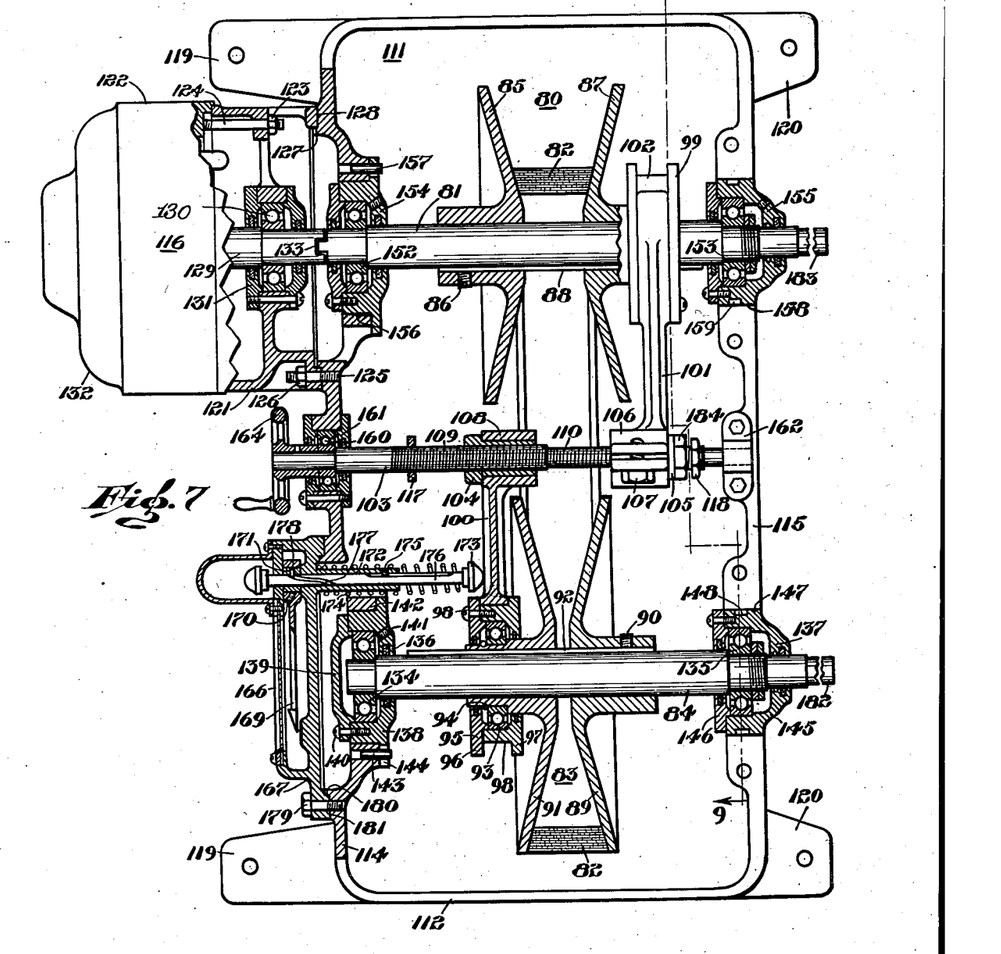
Figure 7 is a plan view, partly in section and with the cover of the enclosing casing removed, of another form of variable speed power unit embodying the invention.
Figure 8:
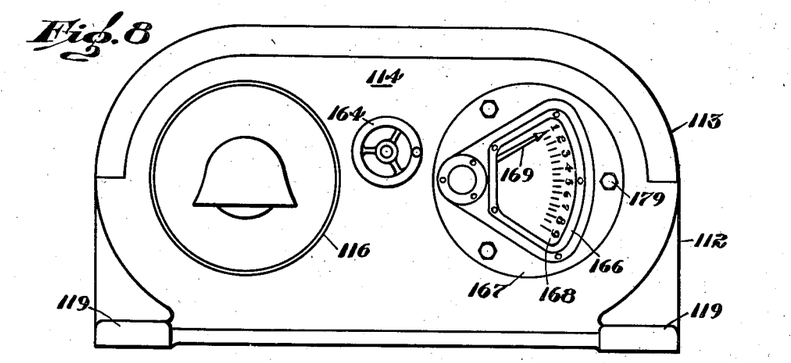
Figure 8 is a side elevation taken from the left hand side of Figure 7.
Figure 9:
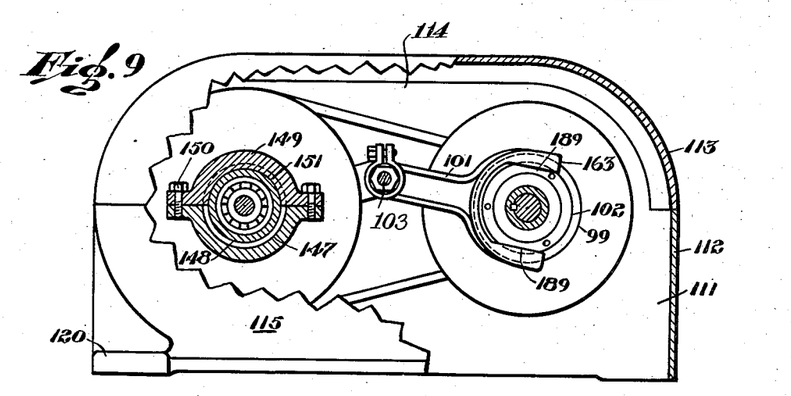
Figure 9 is a side elevation taken from the right hand side of Figure 7, and partly in section taken along the plane 9—9 of Figure 7.
Figure 10:
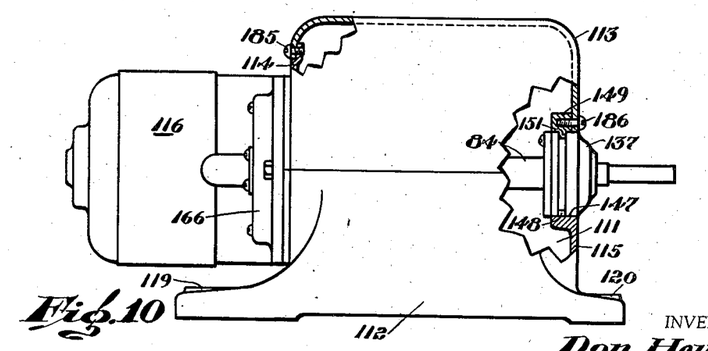
Figure 10 is an end view, partly in section, taken from the right hand side of Figure 8.
Figure 11:
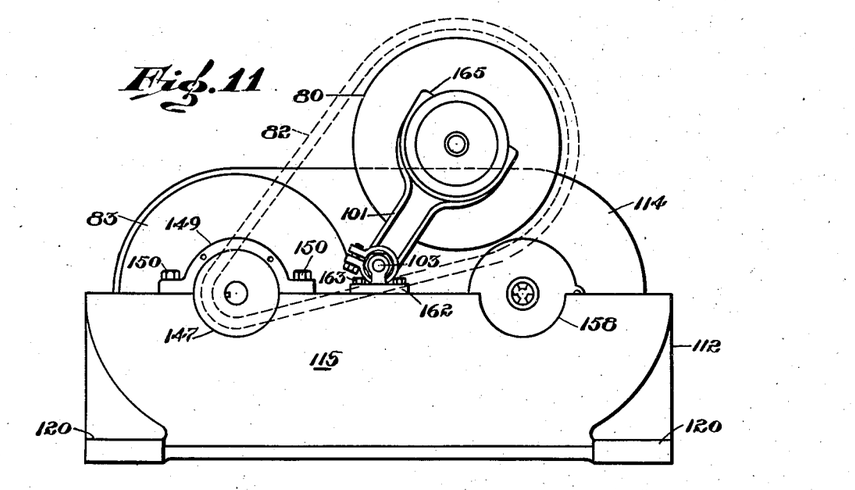
Figure 11 is a side elevation taken from the right hand side of Figure 7, and with the cover of the enclosing casing removed, illustrating the manner in which the driving belt may be removed.
Figure 12:
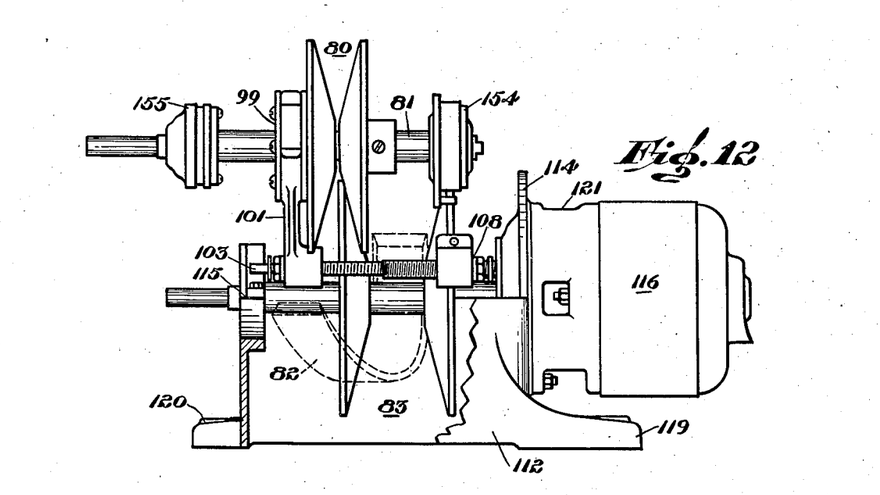
Figure 12 is an end view, partly in section, taken from the right hand side of Figure 11.

In the form of the variable speed power unit illustrated by Figures 7 to 12, the variable speed transmission is enclosed within the casing 111, formed by the main casing member 112 and the cover member 113. The main casing member 112 is provided with the opposite faced side walls 114 and 115, which provide means for supporting the entire variable speed transmission and the driving electric motor 116. As illustrated by Figures 8 and 10, the side wall 114 extends substantially to the top of the casing to provide a surface for mounting the driving electric motor. The other side wall 115 extends only to the plane of the axes of the driving and driven shafts, as illustrated by Figure 11. Thus, as illustrated by Figures 11 and 12, when the cover member 113 is removed, substantial access may be had to the belt and pulley structures. As illustrated by Figures 8, 9 and 10, the cover member 113 rests on top of the side walls 114 and 115 and on the end walls of the main casing member 112. Suitable means may be provided for securing the cover member to the main casing member 112. In the present instance the cover 113 is secured to the wall 114 by the screws 185 and to the bearing clamping member 149 by the screws 186. In order to provide means for securing the power unit to the supporting foundation, the main body of the casing 112 is provided with the feet 119, which extend a substantial distance beyond the wall 114 to provide a stable support for the driving motor, and with the feet 120 which project beyond the opposite side wall.

The driving electric motor 116 is supported on the wall 114 of the transmission casing by the motor adapter bracket 121, which is secured to the frame 122 of the motor by the nuts 123 and the studs 124, and to the wall of the transmission casing by the studs 125 and the nuts 126. The motor adapter bracket 121 and the driving electric motor supported thereby are accurately supported in coaxial relation with the driving shaft 81 by the engagement of the internal cylindrical surface 127 and the radial surface 128, formed on the transmission casing, with corresponding surfaces formed on the member 121.

The driving electric motor is provided with the motor shaft 129, one end of which is rotatably supported by the bearing 130, secured within the bearing housing 131 formed on the member 121, and the other end of which is rotatably supported by a bearing suitably secured within a bearing housing formed on the end bell 132. The driving connection between the motor shaft 129 and the driving shaft 81 of the variable speed transmission is formed by the jaw coupling 133, formed on the abutting shaft ends. The jaw coupling 133 is so formed that the shafts may be disengaged by a separating axial movement of one of the shafts with respect to the other shaft. Thus the driving electric motor may be removed from the assembly of the variable speed power unit, by removing the nuts 126, without the necessity of disturbing the position of the driving shaft 81; or the driving shaft 81, together with the driving pulley structure, may be removed from the assembly of the transmission, without the necessity of removing the driving motor from its supporting structure.

In order to provide means whereby the driving and driven shafts, together with the pulley structures supported thereby, may be quickly removed from the transmission casing, the bearings for rotatably supporting these shafts are held within bearing housings, which are removably supported on the main body 112 of the transmission casing. Thus the driven shaft 84 is rotatably supported by the bearings 134 and 135, which are respectively held within the removably supported bearing housings 136 and 137. The bearing housing 136 is formed by the flanged member 138 and the bearing cap 139, which are suitably held together by the screws 140. The bearing housing may be provided with the lubricating connection 141 and a suitable lubricant retaining seal for preventing the escape of lubricant from the bearing housing. The bearing housing is accurately located in coaxial relation with the driven shaft by the engagement of the internal cylindrical surface 142, formed on the wall 114, with a corresponding surface formed on the bearing housing. To provide means for preventing the rotation of the bearing housing, the pin 143 is provided, which engages the slot 144 formed on the flanged member 138. In this way the bearing housing 136 may be removed from the supporting wall 114, by moving the driven shaft 84 in an axial direction toward the right, as viewed in Figure 7, until the bearing housing clears the internal cylindrical surface 142 formed on the supporting wall.

The bearing housing 137 is formed by the housing member 145 and the bearing cap 146. The bearing housing is supported by the internal cylindrical surface 147, formed partly on the wall 115 and partly on the clamping member 149, Figures 9, 10 and 11, which is suitably secured to the wall 115 by the bolts 150. In order to provide means for locking the bearing housing 137 against axial movement, the member 145 has the annular groove 148 formed in the external periphery thereof, and the clamping member 149 has the projecting ridge 151 formed thereon. It is thus obvious that, when the clamping member 149 is in position, the bearing housing 137 will be rigidly supported and held against axial movement; but when the clamping member is removed, the bearing housing is free to move axially (see Fig. 10).

The driving shaft 81 is rotatably supported by the bearings 152 and 153, which are held within the removably supported bearing housings 154 and 155. Bearing housing 154 is supported on the wall 114 by the engagement of the internal cylindrical surface 155, formed on the wall, with a corresponding surface formed on the bearing housing, and is held against rotation by the pin 157. The cylindrical surface 156 is in every way identical with the corresponding surface 142, which supports the bearing housing 136, thus providing means whereby the positions of the driving and driven shafts may be interchanged within the casing. The bearing housing 155 is supported on the wall 115 by the engagement of the internal cylindrical surface 158, formed partly on the wall 115 and partly on a clamping member, similar to the member 149. The bearing housing is also provided with the annular groove 159, which performs the same function as the annular groove 148, formed on the bearing housing 137. The internal cylindrical surface 158 is formed with the same dimensions as the cylindrical surface 127, to provide means whereby the positions of the driving and driven shafts may be interchanged within the casing.

It is obvious from an inspection of Figures 7 and 9 that, the driving belt 82 not only encircles the driving and driven shafts; but that it also encircles the lead screw 103. When it is desired to remove the driving belt from the pulley structure, it is not only necessary to pass the belt over the ends of the driving and driven shafts; but it is also necessary to pass the belt over the end of the lead screw 103. In order to provide means, whereby the driving belt may be readily passed over the end of the lead screw, the lead screw is supported with its axis above the plane of the axes of the driving and driven shafts. Thus as illustrated by Figure 11, the lead screw is supported with its axis above the wall 115. One end of the lead screw is supported by the bearing 160, held within the bearing housing 161 formed on the wall 114, and the other end of the lead screw is rotatably supported by the bearing pedestal 162, which is removably secured to the top of the wall 115. The bearing pedestal 162 is made of sufficient height to provide a substantial clearance between the lead screw 103 and the top of the wall 115. Thus as illustrated by Figure 12, when the bolts 163, holding the bearing pedestal to the wall are removed together with the pedestal, there is sufficient space between the lead screw and the top of the wall 115 to permit the belt to be passed between these members.

Thus when it is desired to remove the driving belt, or the driving or driven pulley structure from the assembly of the variable speed power unit, the cover member 113 may be removed to give access to the shift forks 100 and 101 and to the clamping members of the bearing housings 137 and 155. With the cover removed, one of the threaded bushings 104 or 105 may be released within the clamping sleeve of the shift fork, and manipulated to release the belt tension. The clamping members 149 of the bearing housings 137 and 155, and the bearing pedestal 162 may then be removed. With these members removed, the driving shaft 81 may be moved axially toward the right, as viewed in Figure 7, until the end of the shaft clears the internal cylindrical surface 156 formed on the wall 114. The entire driving pulley structure may then be rotated about the axis of the lead screw 103, to lift the pulley structure out of main casing member 112, into the position illustrated by Figures 11 and 12. With the pulley in this position, the belt may be easily removed from the driving pulley structure, as illustrated by these figures. The belt then may be passed between the lead screw 103 and the top of the wall 115, after which, the driven shaft may be moved axially toward the right, as viewed in Figure 7, to clear the cylindrical surface 142 formed on wall 114, and then lifted upwardly to permit the driving belt to pass over the end of the shaft.

To provide means whereby the driving and driven pulley structures may be quickly removed from the assembly of the variable speed power unit, the forked levers 100 and 101 are made with open ends. Thus when the driving pulley structure has been lifted into the position illustrated by Figure 11, and the belt removed, the pulley structure may be removed from the shift fork by pulling the bearing housing 99 out through the open end 165 of the shift fork.

To provide means for indicating the speed ratio adjustment, the speed indicator 166 is provided, which is secured to the wall 114 of the transmission casing. The speed indicator 166 includes the frame 167, to which the graduated scale 168 is secured, and the pivotally supported pointer 169, which is actuated in accordance with the axial adjustment of the pulley section 91. The pointer 169 is secured to the bushing 171 by the set screw 170, and the bushing 171 is in turn pivotally supported on the axially adjustable rod 172. The rod 172 is provided with the head 173, which is urged into engagement with the shift fork 100 by the compression spring 174. The rod is supported for axial movement by the frame 167, but is held against rotation by the pin 175, which engages the axially extending groove 176, formed in the rod. The rod 172 also has the helical groove 177 formed therein, which engages the pin 178, secured to the bushing 171. As has been stated, the bushing 171 is secured to the pointer 169. Thus when the shift fork 100 is moved axially in response to the rotation of the hand wheel 164, the resultant axial movement of the rod 172 results in a pivotal movement of the bushing 171, and of the pointer 169 secured thereto. It is thus obvious that the pointer 169 will be actuated in accordance with the axial adjustment of the pulley section 91 to indicate the speed ratio adjustment of the variable speed drive.

The frame 167 of the speed indicator is removably secured to the wall of the transmission casing by the bolts 179. The speed indicator is located on the wall of the transmission casing by the engagement of the internal cylindrical surface 180 and of the radial surface 181, formed on the wall 117, with corresponding cylindrical and radial surfaces, formed on the frame 167 of the speed indicator. To provide means whereby the driving motor and the driving pulley structure may be interchanged in position with the driven shaft and the driven pulley structure, the surfaces 180 and 181, provided for supporting the speed indicator, are made with the same dimensions as the surfaces 127 and 128, provided for supporting the driving motor. Thus the driving motor may be supported either by the surfaces 127 and 128, or by the surfaces 180 and 181.

I claim:

1. In a variable speed power unit, a pair of pulley structures, at least one of said structures having a variable effective diameter, a belt engaging said structures, a casing enclosing said structures and the belt, a load driving means operated by one of the pulley structures and extending out of the casing, a source of power projecting from the casing and having a rotor for driving the other structure, means operated by the source of power and supported by the rotor for circulating a cooling stream of air from the exterior of the casing and through the casing, and means providing inlet and outlet passages for said stream of air between the interior and the exterior of the casing.

2. In a variable speed power unit, a pair of pulley structures, at least one of said structures having a variable effective diameter, a belt engaging said structures, a casing enclosing said structures and the belt, a load driving means operated by one of the pulley structures and extending out of the casing, a source of power outside the casing including a housing and arranged to drive the other structure, means forming passages between the interior and the exterior of the housing, fan means operated by the source of power for circulating cooling air through said housing, said casing being provided with means whereby said fan means may also circulate a stream of cooling air from the exterior of said casing through said casing and in contact with the pulleys and the belt.

3. In a variable speed power unit, a pair of pulley structures, at least one of said structures having a variable effective diameter, a belt engaging said structures, a casing enclosing said structures and the belt, a load driving means operated by one of the pulley structures and extending out of the casing, a source of power projecting from the casing and having a rotor for driving the other structure, means operated by the source of power and supported outside of said casing for circulating a cooling stream of air from the exterior of the casing and through the casing, and means providing inlet and outlet passages for said stream of air between the interior and the exterior of the casing.

4. In a variable ratio transmission, a shaft, a pulley structure in axial driving relation to said shaft, said pulley structure including a pair of relatively axially adjustable sections with opposed inclined faces, forming by relative axial adjustment, variable effective pulley diameters, a pair of bearing structures to support the shaft rotatably, speed adjusting mechanism adapted to vary the axial distance between the sections of said pulley structure and including means to support one of said bearing structures, a cage to support the other bearing structure, means forming a lower frame member adapted to support said speed adjusting mechanism and said cage, means forming an upper frame member adapted to secure the speed adjusting mechanism and the cage in the lower member, when the frame members are in assembled relationship, and means to secure said members in assembled relationship, said frame members being joined substantially along a plane passing through the axis of said shaft, whereby said shaft and pulley structure together with the bearings and speed adjusting mechanism may be removed as a unit from the frame.

5. In a variable ratio transmission, a shaft, a pulley structure mounted on said shaft, a source of power in axial driving relation with said shaft and having a housing, bearings to support the shaft rotatably and supported by said housing, means forming a lower frame member adapted to support the housing, means forming an upper frame member adapted to secure the housing in said lower member when the frame members are in assembled relationship, and means to secure said members in assembled relationship, said frame members being joined substantially along a plane passing through the axis of said shaft, whereby the source of power together with the shaft and pulley may be removed as unit from the frame.

6. In a variable ratio transmission, a shaft, a pulley structure in axial driving relation to said shaft, said pulley structure including a pair of relatively axially adjustable sections with opposed inclined faces, forming by relative axial adjustment, variable effective pulley diameters, bearing structures to support the shaft rotatably, speed adjusting mechanism adjacent one end of the shaft and having a housing coaxial with the shaft, one of said bearing structures being supported in the housing, means spaced from said housing and secured thereto forming a supporting surface about the shaft, a cage to support the other bearing structure, and a casing having means to support said cage and having a surface to cooperate with the said supporting surface and thereby support the speed adjusting mechanism, there being openings between said surface on the housing and the housing, whereby the interior of the casing is in communication with the space surrounding the housing, said casing being divided into upper and lower members substantially along a plane passing through the axis of said shaft, whereby, when the upper and lower members are in assembled relationship, the means forming a supporting surface on the housing as well as the bearing cage are secured between them, and when they are disassembled said shaft and pulley structure together with the bearings and speed adjusting mechanism may be removed as a unit from the frame, and means to secure said upper and lower members in assembled relationship.

7. In a variable ratio transmission, a shaft, a pulley structure mounted on said shaft, a source of power having a housing and in axial driving relation with said shaft, bearings to support the shaft rotatably and supported by said housing, said housing including an adapter member having a supporting surface formed thereon about the shaft, a casing having a supporting surface adapted to cooperate with the supporting surface on said adapter member and thereby support the source of power, there being a passageway in said adapter member whereby the interior of the casing is in communication with the interior of the housing, said casing being divided into upper and lower members substantially along a plane passing through the axis of said shaft, whereby when the upper and lower members are in assembled relationship the adapter member is clamped between them, and when they are disassembled the source of power together with the shaft and pulley may be removed as a unit from the casing, and means to secure said upper and lower members in assembled relationship.

8. In a variable ratio transmission, a driven shaft, a driving shaft, a pair of pulley structures respectively associated with said shafts, at least one of said pulley structures having a pair of relatively axially adjustable sections with opposed inclined belt engaging faces forming by relative axial adjustment, variable effective pulley diameters, speed adjusting mechanism associated with said driven shaft to axially adjust the sections of said variable diameter pulley structure, and having a housing with a supporting surface formed thereon about the driven shaft, said housing supporting a bearing for said driven shaft, a source of power in axial driving relation with said driving shaft and including bearings to support said driving shaft, means forming a supporting surface on said source of power about the driving shaft, and a frame having surfaces formed thereon adapted to cooperate with the supporting surfaces on said housing and said source of power, said surfaces having corresponding dimensions and said frame being divided into upper and lower members substantially in the plane of the axes of the shafts, whereby, when the upper and lower members are in assembled relationship, the housing and the source of power are clamped between them, and when they are disassembled the source of power together with its shaft and pulley, and the driven shaft with its pulley and speed adjusting mechanism, may be removed each as a unit from said frame and be interchanged in position with respect to the frame, and means to secure said upper and lower members in assembled relationship.

9. In a variable speed power unit, a pair of pulley structures, at least one of said structures having a variable effective diameter, a belt engaging said structures, a casing enclosing said structures and the belt, a load driving means operated by one of the pulley structures and extending out of the casing, an electric motor for driving the other structure and having a stator with a frame, and an adapter member, comprising a hollow shell and a transverse partition wall therein, for supporting said electric motor on said casing, there being an opening in said member whereby the interior of the casing is in communication with the space in the adapter member on one side of said wall, there being an opening in said wall whereby said space is in communication with the interior of the frame, said member having an opening whereby said space is in communication with the medium surrounding the unit, said member also having an opening whereby the interior of said frame is in communication with the medium surrounding the unit.

DON HEYER.